(12) United States Patent
Lai

(10) Patent No.: US 8,567,636 B2
(45) Date of Patent: Oct. 29, 2013

(54) HYDRO-PNEUMATIC PRESSURE VESSEL

(76) Inventor: Han-Chin Lai, Taichung (TW)

( * ) Notice: Subject to any disclaimer, the term of this patent is extended or adjusted under 35 U.S.C. 154(b) by 0 days.

(21) Appl. No.: 13/315,315

(22) Filed: Dec. 9, 2011

(65) Prior Publication Data

US 2012/0152959 A1    Jun. 21, 2012

(30) Foreign Application Priority Data

Dec. 16, 2010    (TW) ............................... 99144207 A

(51) Int. Cl.
  *B65D 6/12*    (2006.01)
  *B65D 88/54*   (2006.01)

(52) U.S. Cl.
  CPC .................................... *B65D 88/548* (2013.01)
  USPC ............................................... 220/723

(58) Field of Classification Search
  CPC ......................... F15B 2201/21; F15B 2201/20
  USPC ......... 220/530, 529, 723, 722, 721, 720, 581, 220/694, 500; 138/30
  See application file for complete search history.

(56) References Cited

U.S. PATENT DOCUMENTS

| | | | | | |
|---|---|---|---|---|---|
| 21,761 | A | * | 10/1858 | Keane | 222/386.5 |
| 1,561,101 | A | * | 11/1925 | Mott et al. | 220/581 |
| 1,939,611 | A | * | 12/1933 | Purvis | 222/310 |
| 2,299,611 | A | * | 10/1942 | Clark | 138/30 |
| 2,300,722 | A | * | 11/1942 | Kleinhans et al. | 138/30 |
| 2,324,701 | A | * | 7/1943 | Herman | 138/30 |
| 2,342,356 | A | * | 2/1944 | Mercier | 138/30 |
| 2,349,322 | A | * | 5/1944 | White | 138/30 |
| 2,389,792 | A | * | 11/1945 | Lippincott | 138/30 |
| RE23,333 | E | * | 1/1951 | Mercier | 138/30 |
| 2,604,118 | A | * | 7/1952 | Greer | 138/30 |
| 2,758,747 | A | * | 8/1956 | Stevens | 220/530 |
| 2,804,884 | A | * | 9/1957 | Knox | 138/30 |
| 2,879,785 | A | * | 3/1959 | Vesterdal et al. | 137/264 |
| 3,347,406 | A | * | 10/1967 | Katzenmeyer | 220/530 |
| 3,511,280 | A | * | 5/1970 | Mercier | 138/30 |
| 3,868,972 | A | * | 3/1975 | Zirps | 138/30 |
| 4,192,350 | A | * | 3/1980 | Mercier | 138/30 |
| 4,351,363 | A | * | 9/1982 | Haug et al. | 138/30 |
| 4,526,205 | A | * | 7/1985 | Sugimura et al. | 138/30 |
| 4,671,325 | A | * | 6/1987 | Otter | 138/30 |
| 4,723,577 | A | * | 2/1988 | Wusterbarth | 138/30 |
| 4,784,181 | A | * | 11/1988 | Hilverdink | 138/30 |
| 2004/0050439 | A1 | * | 3/2004 | Weber | 138/30 |

* cited by examiner

*Primary Examiner* — Robert J Hicks
(74) *Attorney, Agent, or Firm* — Trop, Pruner & Hu, P.C.

(57) ABSTRACT

A hydro-pneumatic pressure vessel includes a container unit, a connector unit and a protecting unit. The container unit includes an elastic diaphragm dividing an inner space of the container unit into a water chamber and an air chamber. The connector unit includes a water fitting connected to the container unit and formed with a water port. The protecting unit includes a protecting member and a resilient connecting member interconnecting the water fitting and the protecting member. The protecting member is movable from an open position to a blocked position for blocking the water port so as to prevent the diaphragm from being squeezed by an air pressure of the air chamber into the water port.

10 Claims, 4 Drawing Sheets

US 8,567,636 B2

HYDRO-PNEUMATIC PRESSURE VESSEL

CROSS-REFERENCE TO RELATED APPLICATION

This application claims priority of Taiwanese Application No. 099144207, filed on Dec. 16, 2010.

BACKGROUND OF THE INVENTION

1. Field of the Invention

The invention relates to a pressure vessel, more particularly to a hydro-pneumatic pressure vessel with a protecting unit.

2. Description of the Related Art

Hydro-pneumatic pressure vessels are at present widely used in industrial and residential pump piping system, for example, for stabilizing water pressure and absorbing water hammers.

The basic configuration of a hydro-pneumatic pressure vessel includes a first vessel, a second vessel coupled to the first vessel and an elastic diaphragm that is made of rubber and that is disposed for dividing an inner space in the first and second vessels into a water chamber and an air chamber. A water fitting and an air valve are provided respectively on the first and second vessels to communicate fluidly and respectively the water chamber and the air chamber. Hydro-pneumatic pressure vessels with such configuration are disclosed in U.S. Pat. Nos. 4,192,350, 4,351,363, 4,723,577, 4,784,181, etc. In the above, the diaphragm illustrated in U.S. Pat. No. 4,784,181 is a bladder-type diaphragm.

When the water pressure drops suddenly, the diaphragm may be pushed toward the water fitting by the pressure inside the air chamber. Consequently, a portion of the diaphragm may be damaged due to being squeezed into a water ports of the water fitting. To alleviate the damage, some solutions are disclosed in the present art. For example, in a first solution, as disclosed in U.S. Pat. Nos. 4,192,350 and 4,351,363, a metal block is embedded in the portion of the diaphragm that would be drawn to the water port during the deformation of the diaphragm. In a second solution, as disclosed in U.S. Pat. No. 4,723,577, the thickness of the portion of the diaphragm is increased. In a third solution, as shown in FIG. 1, another conventional pressure vessel has the water fitting 101 welded to a plate 105 formed with a plurality of small holes 102. The water chamber 103 communicates with the water fitting 101 via the small holes 102, while the diaphragm 104 can be blocked by the plate 105.

The above-mentioned solutions have a favorable effect in a hydro-pneumatic pressure vessel having an air pressure in the air chamber under 16 kg/cm$^2$. However, when the hydro-pneumatic pressure vessel is used in skyscrapers, the air pressure must be enhanced to 25 kg/cm$^2$ or higher for the practical necessity. As a result, all the above mentioned solutions can hardly attain the effect as in a lower pressure application. In the first solution, the connection between the rigid metal block and the elastic diaphragm may be affected under such high pressure. In the second solution, the portion of the diaphragm may be damaged. In the third solution, the diaphragm 104 may be squeezed into the small holes 102.

SUMMARY OF THE INVENTION

Therefore, the object of the present invention is to provide a hydro-pneumatic pressure vessel with a protecting unit which is capable of avoiding damage of a diaphragm thereof to prolong the service life of the diaphragm.

Accordingly, a hydro-pneumatic pressure vessel of this invention comprises a container unit, a connector unit and a protecting unit. The container unit includes an elastic diaphragm that divides an inner space of the container unit into a water chamber and an air chamber. The connector unit includes a water fitting connected to the container unit and formed with a water port communicating fluidly with the water chamber. The protecting unit includes a protecting member that is disposed in the water chamber and that has a size larger than that of said water hole, and a resilient connecting member that interconnects the water fitting and the protecting member. The protecting member is movable resiliently between an open position, where the water chamber is filled with water and where the protecting member, is away from the water port, and a blocked position, where the water flows out of the water chamber, where the resilient connecting member is compressed resiliently and where the protecting member blocks the water port so as to prevent the diaphragm from being squeezed by an air pressure of the air chamber into the water port.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
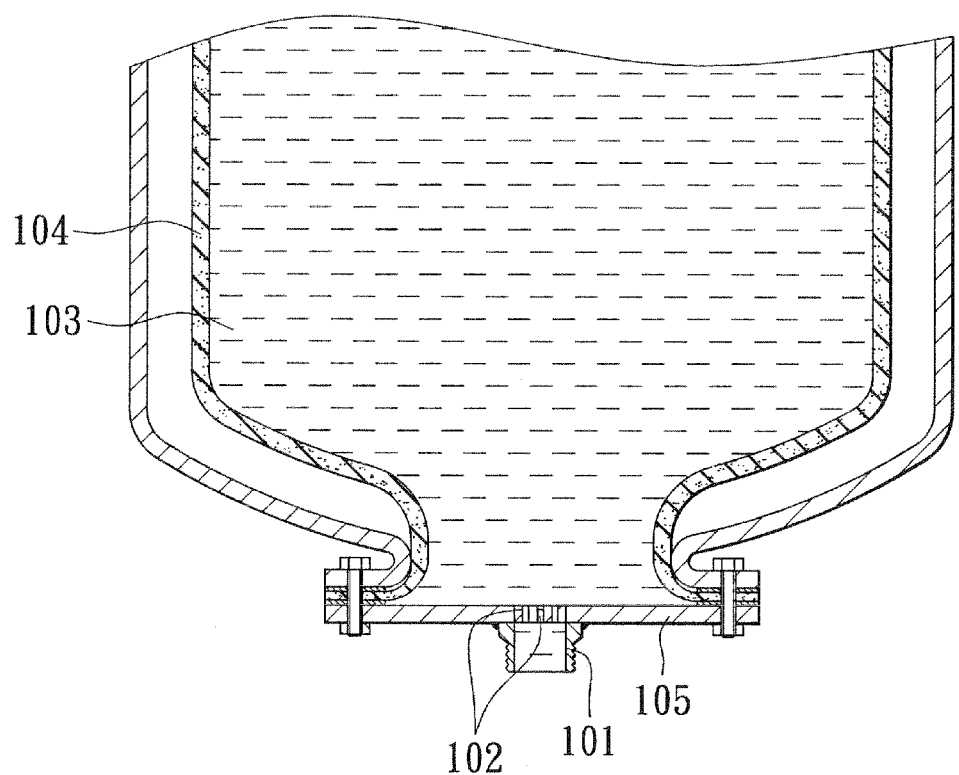
FIG. 1 is a fragmentary sectional view of a conventional hydro-pneumatic pressure vessel.
Figure 2:
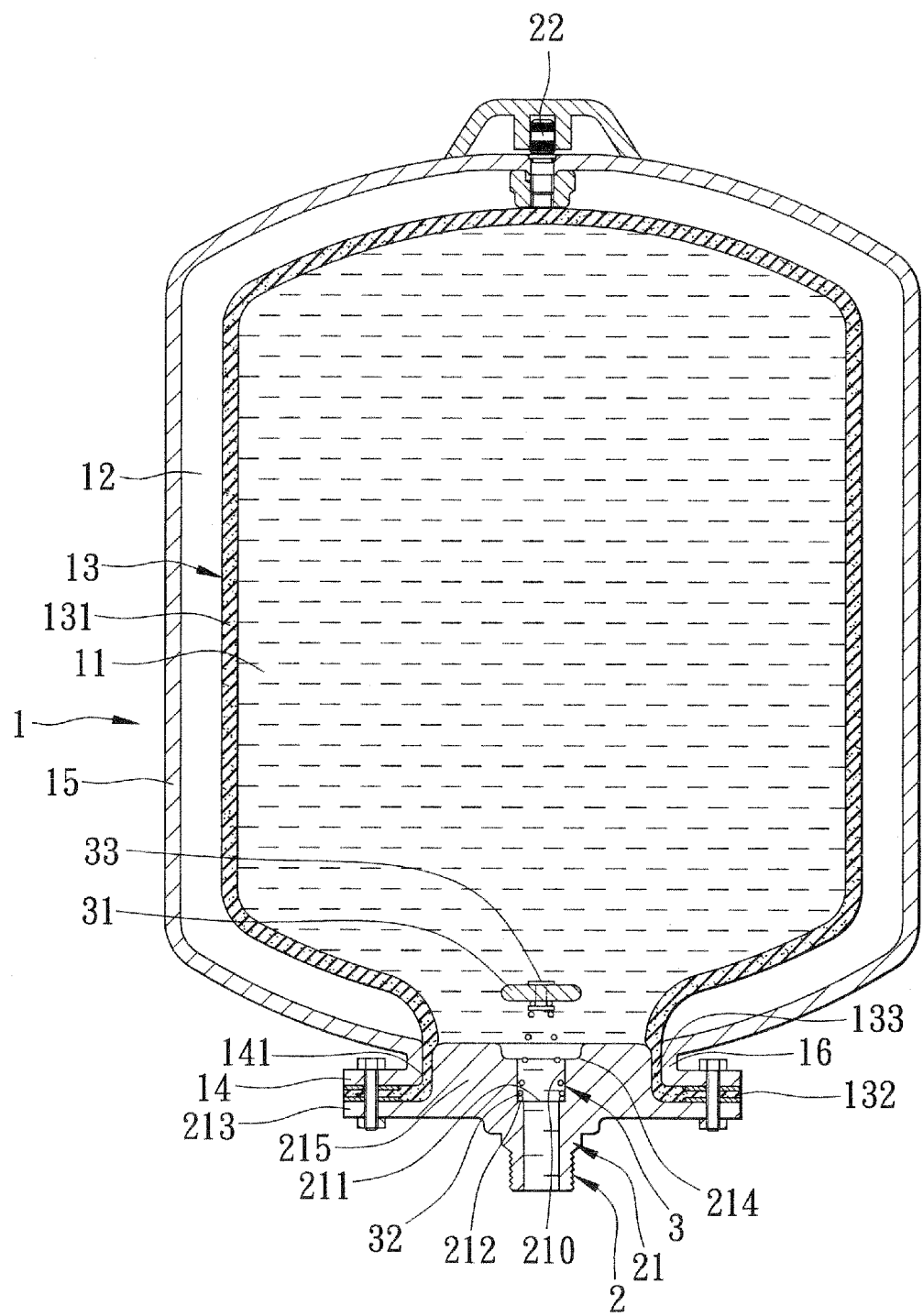
FIG. 2 is a sectional view of a preferred embodiment of a hydro-pneumatic pressure vessel according to the present invention, illustrating a water chamber that is filled with water and a protecting member that is at an open position.

As shown in FIG. 2, the preferred embodiment of a hydro-pneumatic pressure vessel according to the present invention comprises a container unit 1, a connector unit 2 and a protecting unit 3.

The container unit 1 includes an elastic diaphragm 13 that divides an inner space of the container unit 1 into a water chamber 11 and an air chamber 12 and that is a bladder-type diaphragm. The container unit 1 further includes a container body 15 defining the inner space, a flange segment 14 defining an opening 141, and a neck segment 16 interconnecting the container body 15 and the flange segment 14. The diaphragm 13 has a main portion 131 disposed in the container body 15, an end portion 132 disposed to correspond in position to the flange segment 14, and a connecting portion 133 interconnecting the main portion 131 and the end portion 132 and corresponding in position to the neck segment 16.

The connector unit 2 includes a water fitting 21 connected to the water chamber 11 and a gas valve 22 connected to the air chamber 12. The water fitting 21 has an inner surrounding surface 210 defining a water port 211 that communicates fluidly with the water chamber 11, a shoulder portion 212 formed on the inner surrounding surface 210, a flange portion 213 surrounding the water port 211 and spaced apart from the flange segment 14 of the container unit 1 and a hole-defining portion 215 disposed between the water port 211 and the flange portion 213. The hole-defining portion 215 of the water fitting 21 has an outer surface.

The neck segment 16 of the container unit 1 has an inner surface that is spaced apart from and that corresponds in position to the outer surface of the hole-defining portion 215 of the water fitting 21. The end portion 132 of the diaphragm 13 is clamped between the flange segment 14 of the container unit 1 and the flange portion 213 of the water fitting 21. The connecting portion 133 of the diaphragm 13 is clamped between the outer surface of the hole-defining portion 215 of the water fitting 21 and the inner surface of the neck segment 16 of the container unit 1. The thickness of the end portion 132 of the diaphragm 13 is slightly larger than the distance between the flange segment 14 of the container unit 1 and the flange portion 213 of the water fitting 21. The thickness of the connecting portion 133 of the diaphragm 13 is slightly larger than the distance between the outer surface of the hole-defining portion 215 of the water fitting 21 and the inner surface of the neck segment 16 of the container unit 1. Accordingly, the water and gas tightness of the diaphragm 13 are enhanced. The thickness of the diaphragm 13 as used herein means the thickness of the diaphragm 13 before being clamped. In this embodiment, the water fitting 21 further has a receiving groove 214 that communicates fluidly with the water port 211.

The protecting unit 3 includes a protecting member 31 that is disposed in the water chamber 11 and that has a size larger than that of the water port 211 of the water fitting 21 for blocking the water port 211, and smaller than that of the opening 141 of the flange segment 14 of the container unit 1 (i.e., the size of the flange member 14 is larger than that of the protecting member 31) for facilitating the assembly of the hydro-pneumatic pressure vessel of this invention. The protecting unit 3 further includes a resilient connecting member 32 that interconnects the water fitting 21 and the protecting member 31. The protecting member 31 is movable resiliently between an open position (see FIG. 2) where the protecting member 31 is away from the water hole 211, and a blocked position (see FIG. 3) where the resilient connecting member 32 is compressed resiliently and where the protecting member 31 blocks the water port 211 and is received within the receiving groove 214 so as to prevent the diaphragm 13 from being squeezed by an air pressure of the air chamber 12 into the water port 211. The resilient connecting member 32 is configured as a spring that has opposite ends secured respectively to the inner surrounding surface 210 of the water fitting 21 and the protecting member 31. In this embodiment, the resilient connecting member 32 is configured as a conical spiral spring that has a larger end abutting fixedly against the shoulder portion 212, arid a smaller end smaller than the larger end. The protecting unit 3 further includes a coupling member 33 that secures the smaller end of the resilient connecting member 32 to the protecting member 31. The coupling member 33 in this embodiment is a rivet.

It should be noted that the resilient connecting member 32 may be a cylindrical spring, and the coupling member 33 may be welded between the smaller end of the resilient connecting member 32 and the protecting member 31.

In this embodiment, the air chamber 12 is pumped by an air compressor via the gas valve 22 to have a predetermined air pressure of 25 kg/cm$^2$ when the protecting member 31 is at the blocked position. It should be noted that the gas valve 22 may be omitted while solid carbon dioxide (i.e., dry ice) is placed in the air chambers 12 and sublimated to achieve the predetermined air pressure in the air chamber 12.

A pressure for holding the protecting member 31 at the blocked position is configured to be slightly smaller than the predetermined air pressure. Preferably, the ratio of the pressure for holding the protecting member 31 at the blocked position to the predetermined air pressure of the air chamber 12 ranges from 0.9 to 0.95.

Figure 3:
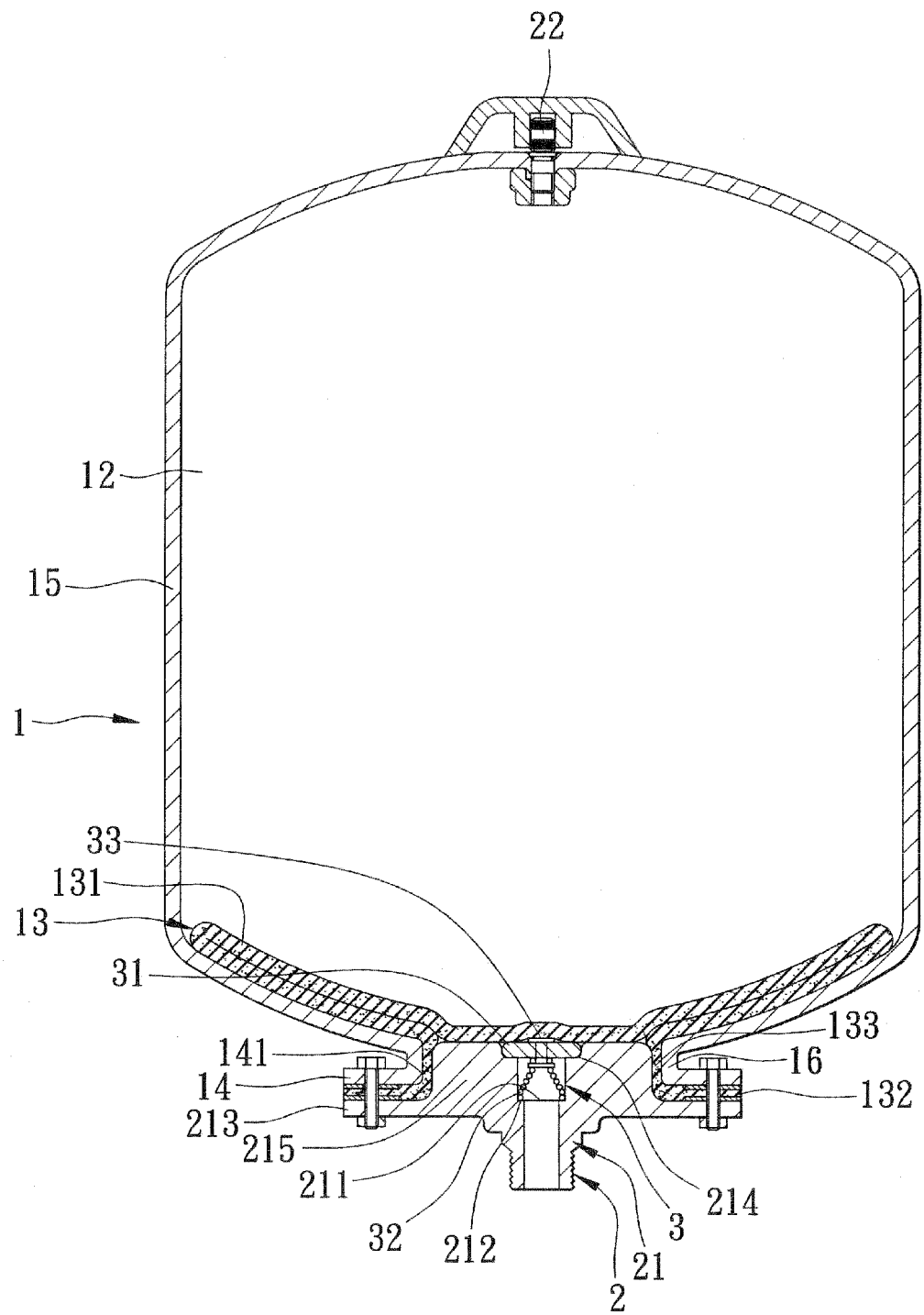
FIG. 3 is another sectional view of the preferred embodiment and illustrates the water in the water chamber that is drained off and the protecting member that is at a blocked position.

Referring to FIG. 3, when the water flows out of the water chamber 11, the water pressure in the water chamber 11 drops suddenly, the diaphragm 13 is pushed toward the water fitting 21 by the pressure inside the air chamber 12 and presses the protecting member 31 to the blocked position, where a top surface of the protecting member 31 is substantially coplanar with that of the hole-defining portion. 215 so as to keep the flatness of the portion of the diaphragm 13 contacting the protecting member 31 and prevent the diaphragm 13 from being squeezed by the air pressure of the air chamber 12 into the water port 211, thereby resulting in a relatively long service life for the diaphragm 13.

Moreover, since the connecting portion 133 of the diaphragm 13 is clamped between the outer surface of the hole-defining portion 215 of the water fitting 21 and the inner surface of the neck segment 16 of the container unit 1, the diaphragm 13 may be kept from the water port 211 to avoid pressing the protecting member 31 too early that hinders the water drainage.

Figure 4:
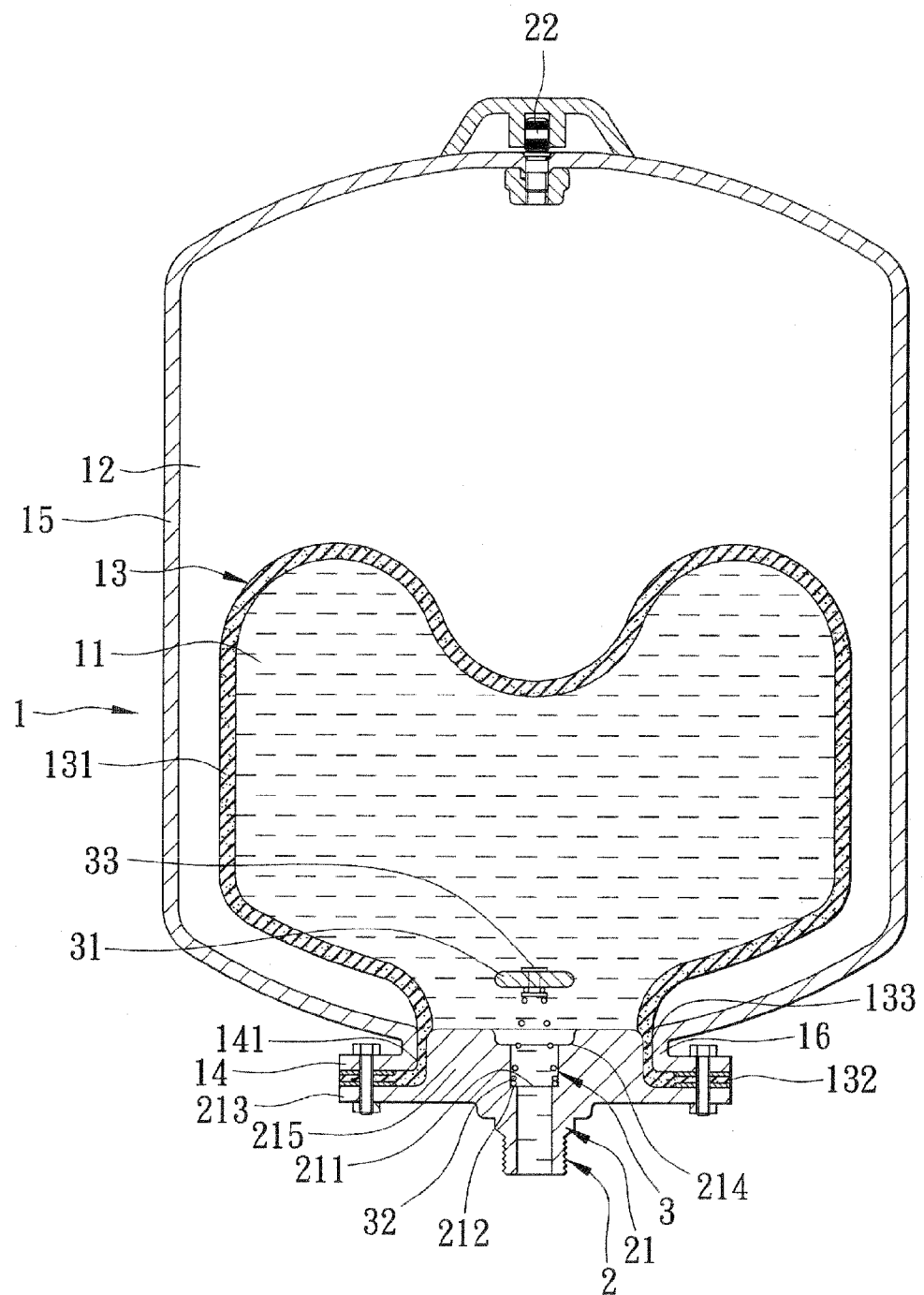
FIG. 4 is still another sectional view of the preferred embodiment and illustrates the water chamber that is partly filled with water.

Referring to FIG. 4, when the water feeding begins once again via the water port 211, the water chamber 11 expands and the resilient connecting member 32 is stretched by the water flow. At this time, the protecting member 31 is floating in the water chamber 11 and is moved back to the open position. Referring back to FIG. 2, when the water chamber 11 is finally filled with water and the hydraulic pressure therein is equal to the air pressure in the air chamber 12, the protecting member 31 is held in the open position by static pressure inside the water chamber 11.

The configuration that The pressure for holding the protecting member 31 at the blocked position which is slightly smaller than the predetermined air pressure has two advantages. The first one is that the action sensitivity of the protecting member 31 would not be too high in water draining. Once the pressure for holding the protecting member 31 at the blocked position is significantly smaller than the predetermined air pressure, the protecting member 31 would be urged to block the water port 211 even before being pressed by the diaphragm 13. The second is that the small difference between the pressure for holding the protecting member 31 at the blocked position and the predetermined air pressure is easy to overcome in the water feeding, since only a relatively small inflow dynamic pressure in addition to a restoring force of the resilient connecting member 32 would be required to push the diaphragm 13.

To sum up, the advantage of this invention is that when the water pressure drops suddenly, the diaphragm 13 is pushed to reach the protecting member 31, i.e. the protecting member 31 prevents the diaphragm 13 from being squeezed by an air pressure of the air chamber 12 into the water port 211, so the service life of the diaphragm 13 may be lengthened. In addition, the protecting unit 3 is disposed on the water fitting 21, so that the diaphragm 13 is not required to be modified, and that the hydro-pneumatic pressure vessel of this invention can also be used under a high-pressure application without being further modified.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A hydro-pneumatic pressure vessel comprising:
a container unit including an elastic diaphragm that divides an inner space of said container unit into a water chamber and an air chamber;
a connector unit including a water fitting that is connected to said container unit and that is formed with a water port communicating fluidly with said water chamber; and
a protecting unit including a protecting member that is disposed in said water chamber and that has a size larger than that of said water port, and a resilient connecting member that interconnects said water fitting and said protecting member, said protecting member being movable resiliently between an open position, where said water chamber is filled with water and where said protecting member is away from said water port, and a blocked position, where the water flows out of said water chamber, where said resilient connecting member is compressed resiliently and where said protecting member blocks said water port so as to prevent said diaphragm from being squeezed by an air pressure of said air chamber into said water port;
wherein said water fitting has an inner surrounding surface that defines said water port;
wherein said resilient connecting member is configured as a conical spiral spring that has a larger end secured fixedly to said inner surrounding surface of said water fitting, and a smaller end secured fixedly to said protecting member;
wherein said resilient connecting member is configured as a conical spiral spring that has a larger end secured fixedly to said inner surrounding surface of said water fitting, and a smaller end smaller than said larger end;
wherein said protecting unit further includes a coupling member that secures said smaller end of said resilient connecting member to said protecting member;
wherein said water fitting further has a shoulder portion formed on said inner surrounding surface; and
wherein said larger end of said resilient connecting member abuts fixedly against said shoulder portion.

2. A hydro-pneumatic pressure vessel comprising:
a container unit including an elastic diaphragm that divides an inner space of said container unit into a water chamber and an air chamber;
a connector unit including a water fitting that is connected to said container unit and that is formed with a water port communicating fluidly with said water chamber; and
a protecting unit including a protecting member that is disposed in said water chamber and that has a size larger than that of said water port, and a resilient connecting member that interconnects said water fitting and said protecting member, said protecting member being movable resiliently between an open position, where said water chamber is filled with water and where said protecting member is away from said water port, and a blocked position, where the water flows out of said water chamber, where said resilient connecting member is compressed resiliently and where said protecting member blocks said water port so as to prevent said diaphragm from being squeezed by an air pressure of said air chamber into said water port;
wherein said water fitting has an inner surrounding surface that defines said water port;
wherein said resilient connecting member is configured as a spring that has opposite ends secured respectively to said inner surrounding surface of said water fitting and said protecting member;
wherein said air chamber has a predetermined air pressure when said protecting member is at said blocked position;
wherein a pressure for holding said protecting member at said blocked position is slightly smaller than said predetermined air pressure; and
wherein a ratio of said pressure for holding said protecting member at said blocked position to said predetermined air pressure of said air chamber ranges from 0.9 to 0.95.

3. The hydro-pneumatic pressure vessel as claimed in claim 1, wherein:
said container unit further includes a container body defining said inner space, a flange segment defining an opening that has a size larger than that of said protecting member, and a neck segment interconnecting said container body and said flange segment;
said water fitting has a flange portion surrounding said water port and spaced apart from said flange segment of said container unit; and
said diaphragm has a main portion disposed in said container body, an end portion clamped between said flange segment of said container unit and said flange portion of said water fitting and having a thickness slightly larger than the distance between said flange segment of said container unit and said flange portion of said water fitting, and a connecting portion interconnecting said main portion and said end portion and disposed to correspond in position to said neck segment of said container unit.

4. The hydro-pneumatic pressure vessel as claimed in claim 3, wherein said water fitting further has a receiving groove for receiving said protecting member when said protecting member is at said blocked position.

5. The hydro-pneumatic pressure vessel as claimed in claim 3, wherein said water fitting further has a hole-defining portion disposed between said water port and said flange portion.

6. The hydro-pneumatic pressure vessel as claimed in claim 5, wherein said hole-defining portion of said water fitting has an outer surface, said neck segment of said container unit has an inner surface that is spaced apart from and that corresponds in position to said outer surface of said hole-defining portion of said water fitting, and said connecting portion of said diaphragm is clamped between said inner surface of said neck segment of said container unit and said outer surface of said hole-defining portion of said water fitting and has a thickness slightly larger than the distance between said inner surface of said neck segment of said container unit and said outer surface of said hole-defining portion of said water fitting.

7. The hydro-pneumatic pressure vessel as claimed in claim 2, wherein:
said container unit further includes a container body defining said inner space, a flange segment defining an opening that has a size larger than that of said protecting member, and a neck segment interconnecting said container body and said flange segment;
said water fitting has a flange portion surrounding said water port and spaced apart from said flange segment of said container unit; and
said diaphragm has a main portion disposed in said container body, an end portion clamped between said flange segment of said container unit and said flange portion of said water fitting and having a thickness slightly larger than the distance between said flange segment of said container unit and said flange portion of said water fitting, and a connecting portion interconnecting said main portion and said end portion and disposed to correspond in position to said neck segment of said container unit.

8. The hydro-pneumatic pressure vessel as claimed in claim 7, wherein said water fitting further has a receiving groove for receiving said protecting member when said protecting member is at said blocked position.

9. The hydro-pneumatic pressure vessel as claimed in claim 7, wherein said water fitting further has a hole-defining portion disposed between said water port and said flange portion.

10. The hydro-pneumatic pressure vessel as claimed in claim 9, wherein said hole-defining portion of said water fitting has an outer surface, said neck segment of said container unit has an inner surface that is spaced apart from and that corresponds in position to said outer surface of said hole-defining portion of said water fitting, and said connecting portion of said diaphragm is clamped between said inner surface of said neck segment of said container unit and said outer surface of said hole-defining portion of said water fitting and has a thickness slightly larger than the distance between said inner surface of said neck segment of said container unit and said outer surface of said hole-defining portion of said water fitting.

* * * * *